United States Patent Office 2,820,201
Patented Jan. 14, 1958

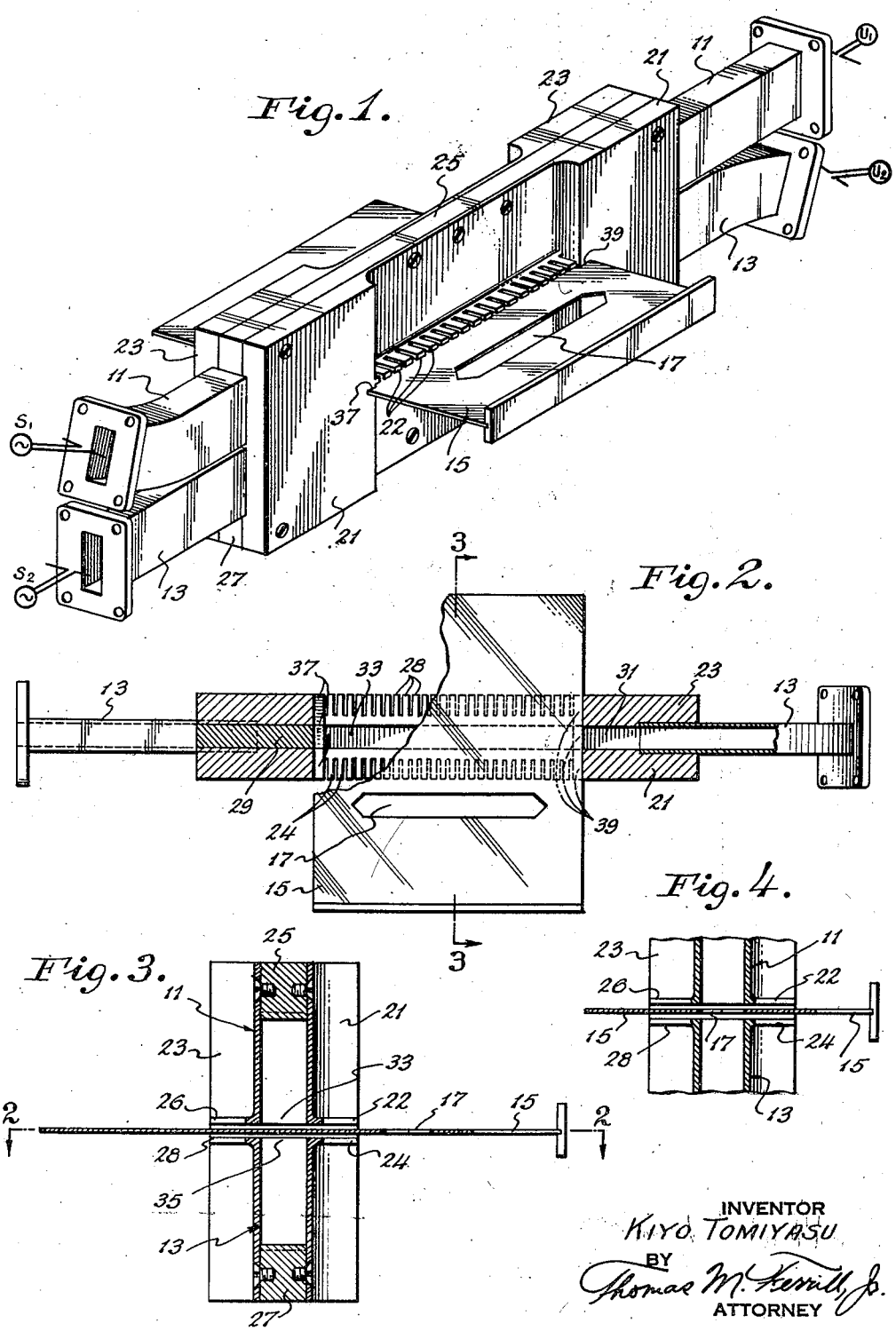

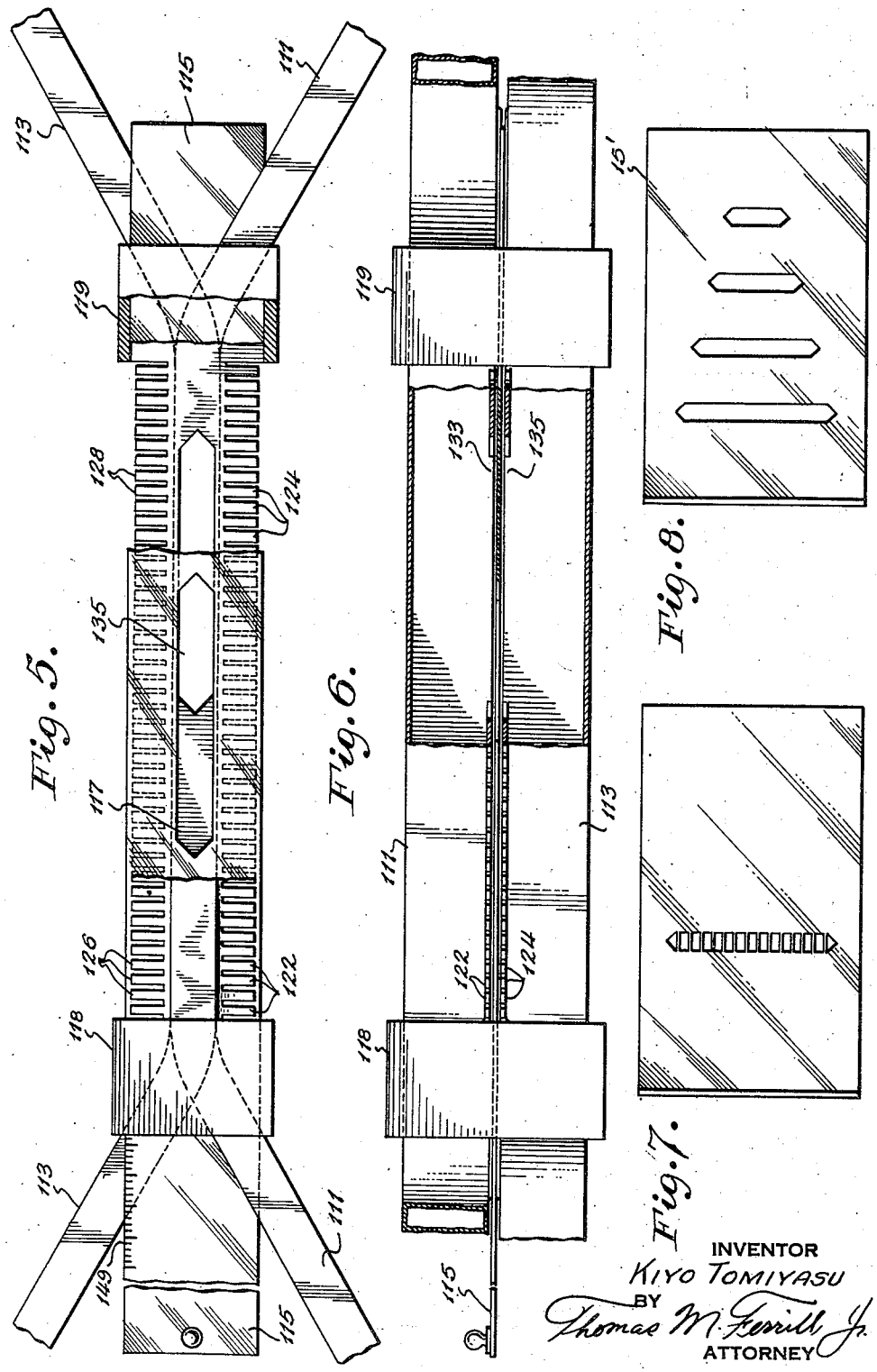

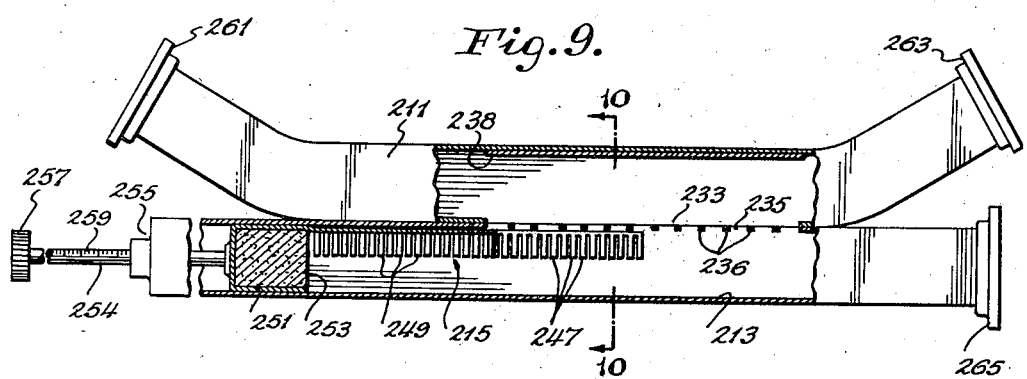
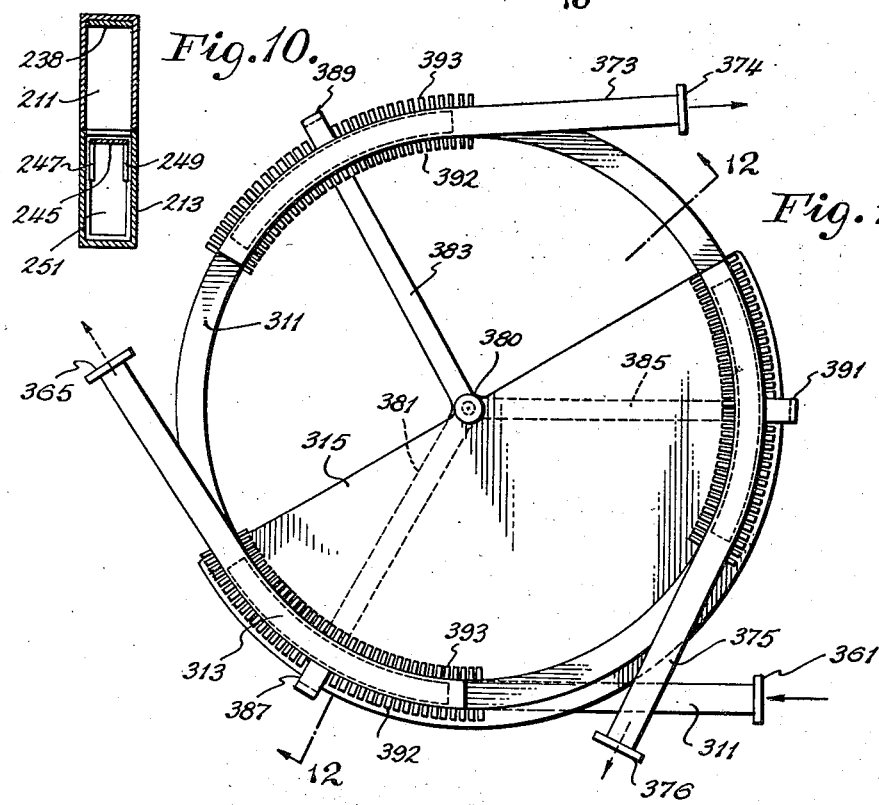
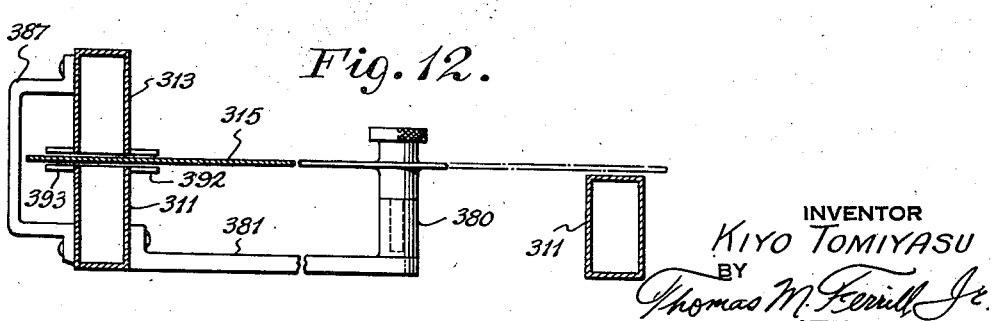

2,820,201

SELECTIVE TRANSFER DEVICE FOR MICROWAVE ENERGY

Kiyo Tomiyasu, Flushing, N. Y., assignor to Sperry Rand Corporation, a corporation of Delaware Application February 28, 1951, Serial No. 213,276

16 Claims. (Cl. 333—7)

The present invention relates to wave guide apparatus for microwave energy, and is particularly concerned with energy transfer apparatus for selective transfer of energy between a plurality of wave guides.

An object of the invention is to provide improved microwave energy path control apparatus.

More specifically, it is an object to provide improved apparatus for selectively transferring energy from one wave guide to another, and for control of the energy transfer.

A further object is to provide improved apparatus for receiving microwave energy through one wave guide and selectively routing it through one or another of plural output wave guide routes.

Yet another object is to provide a compact, improved structure for variable directive coupling between first and second wave guides.

These objectives are met by providing two wave guides fixed in adjacent positions with respective wave guide sections thereof parallel, and providing registering openings in the adjacent walls of the parallel wave guide sections for energy transfer therebetween.

These openings are made of such breadth and length as to provide complete directional transfer of the microwave energy from one of the wave guides to the other, in accordance with the principles of patent application Serial No. 197,064, filed November 22, 1950, in the names of Kiyo Tomiyasu and Seymour B. Cohn.

A movable shutter area of conductive material is interposed between the guides to obstruct the region of communication therebetween, e. g. to totally block the registering openings and to insure confinement of an energy component arriving in one of the two wave guides to cotinuance of propagation in that wave guide. The shutter element is arranged in such a way as to be shiftable to unlock the area of said openings, wholly or partially, and to bring about transfer of all or a substantial part of the microwave energy from one wave guide to the other, or from each supplied wave guide to each other.

Representative embodiments of the present invention are illustrated in the drawings.

Fig. 1 is a perspective view of an energy path control apparatus arranged to serve effectively as a double-throw switch mechanism, for total retention of energy in one wave guide, or for total transfer of energy therefrom to the other of the two wave guides;

Fig. 2 is a longitudinal sectional view of the structure of Fig. 1, taken on the line 2—2 in Fig. 3;

Fig. 3 is a cross-sectional view of the structure of Fig. 1 taken on the line 3—3 in Fig. 2;

Fig. 4 is a fragmentary cross-sectional view illustrating the same structure as shown in Fig. 3 but with the shutter element positioned for total energy transfer from one wave guide to the other;

Fig. 5 is a plan view of a longitudinally adjustable shutter embodiment of the present invention, parts being broken away and parts shown in section, for clarity of illustration;

Fig. 6 is a side elevation of the embodiment of Fig. 5, parts likewise being broken away for clarity of illustration;

Figs. 7 and 8 are drawings of modifications of the shutter 15 of Figs. 1–4;

Fig. 9 is a side elevation of a further embodiment of the present invention, parts being broken away and a portion being shown in section;

Fig. 10 is a cross-sectional view of the structure of Fig. 9 taken on the line 10—10 therein;

Fig. 11 is a plan view of a multi-circuit switching structure embodying the present invention; and Fig. 12 is a cross-sectional view of the structure of Fig. 11, taken on the line 12—12 therein.

The embodiment illustrated in Figs. 1–4 basically includes a first wave guide 11 and a second wave guide 13 rigidly fixed together, with sections of appreciable length in the respective wave guides 11 and 13 positioned parallel and adjacent to each other. Registering openings are provided in the adjacent walls of the respective sections of wave guides 11 and 13, and a shutter element 15 is arranged for transverse sliding movement between these sections of wave guides 11 and 13.

The slide or shutter element 15 is provided with a longitudinal opening 17, so located that the shutter 15 may be moved to a position at which the opening 17 is situated directly between the parallel and adjacent sections of wave guides 11 and 13, permitting energy communication from one of the two guides to the other through the openings therein.

The openings in the wave guides and the opening 17 in shutter 15 are so arranged that when the shutter opening and the wave guide openings are in register, complete directional energy transfer occurs through the openings, from one wave guide to the other. When the slide element 15 has been moved to the position with opening 17 remote from the openings in the parallel wave guide sections, the passage between the wave guides 11 and 13 is closed, and accordingly any energy supplied to one end of one wave guide proceeds directly therethrough to the other end thereof with substantially complete freedom from energy transfer over to the other wave guide. The shutter or slide element 15 is illustrated in Figs. 1, 2 and 3 as positioned for this zero-transfer condition.

The construction chosen for the embodiment illustrated in Figs. 1–4 involves rectangular tubing sections at the ends of the wave guides 11 and 13, the relatively long parallel middle sections of the wave guides 11 and 13 being made up as a composite structure including first and second side plates 21 and 23, upper and lower intermediate longitudinal pieces 25 and 27, and partition elements 29 and 31 (Fig. 2). The inside surfaces of said plates 21 and 23, in the space between the left-hand and right-hand rectangular tubular portions of the wave guides, as seen in Figs. 1 and 2, serve as the interior side wall surfaces of the two wave guides. The upper and lower intermediate pieces 25 and 27 serve not only to afford a mechanically rigid assembly with the side plates 21 and 23, but also, these pieces serve as continuations of the narrow wall surfaces of the respective wave guides; between the left-hand rectangular tubing sections and the right-hand rectangular tubing sections.

Partition element 29 shown in Fig. 2 serves simultaneously as a portion of the lower interior wall surface of the upper wave guide 11, and a portion of the upper interior wall surface of the lower wave guide 13; reaching to the left-hand ends of the openings 33 and 35 in the upper and lower wave guides 11 and 13, respectively. Similarly, partition element 31 serves as an extension of the adjacent narrow interior wall surfaces of the wave guides, between the ends of the right-hand rectangular tubing sections of wave guides 11 and 13 and the right-hand ends of the openings 33 and 35.

The shutter 15 is supported at its left edge in milled conformal slots 37 in the side plates 21 and 23 and partition element 29, and at its right edge, similarly, in milled conformal slots 39 in the side plates 21 and 23 and partition element 31. These slots accurately position shutter 15 and act as guides for the transverse sliding movement thereof.

Extensive recesses are milled in the middle region of said plates 21 and 23, in such a way as to leave flanges extending along the regions thereof adjacent the operating location of shutter 15. These flanges are provided with a series of transverse cuts, in such a way as to form them into serrated chokes 22, 24, 26 and 28, each comprising a series of transversely extending tines parallel to and spaced slightly from the surface of shutter 15.

The length of the tines of the serrated chokes 22, 24, 26 and 28 is preferably of the order of one-fourth wavelength, and the width and spacing between tines and spacing of the tines from the shutter 15 are preferably much smaller than one-fourth wavelength. As an example, three or more tines may be included within a distance of one-fourth wavelength along the serrated choke (i. e., transverse the direction of extension of the tines).

Such serrated chokes per se are described and claimed in U. S. patent application Serial No. 197,063, filed November 11, 1950, in the name of the present inventor.

The rectangular tubing sections of the ends of the wave guides preferably are recessed within the ends of the composite assembly formed of elements 21, 23, 25, 27, 29 and 31, for full alignment and continuity of the interior wave guide wall surfaces; and good electrical continuity between the tubing ends and the composite structure is provided by soldered junctions thereof. The outer ends of the rectangular tubing sections of wave guides 11 and 13 may be provided with flanges, as illustrated in Figs. 1 and 2, for convenience of connection to further wave guide elements or other microwave apparatus.

In the structure illustrated in Figs. 1 and 2, the openings 33 and 35 in the respective wave guides 11 and 13 are appreciably longer than the opening 17 in shutter 15. Accordingly, the length of the opening 17 determines the effective length of the region of intercoupling between the wave guides 11 and 13 when the shutter is in the position illustrated in Fig. 4 for permitting energy transfer between guides 11 and 13. This effective length of the region of communication is of considerable importance to the operation of the structure; and for a given operating frequency, and given internal dimensions of the wave guides 11 and 13, this length of opening 17 may be arranged to provide complete energy transfer from one wave guide to the other with retention of directional energy transmission. With a greater or lesser length of the opening, partial energy transfer is accomplished between the wave guides, with maintained drection of transmission, the incident energy being thus divided into a transferred component and a component transmitted onward through the guide through which it arrived. Thus, if the structure is to serve primarily as a transfer switch system, the opening 17 must be made to be of that length which provides 100% energy transfer.

The principles of operation of this type of coupler system are closely related to those set forth in detail in patent application Serial No. 197,064, filed November 22, 1950, in the names of the present inventor and Seymour B. Cohn as joint inventors.

As explained in the application above referred to, the operation of this type of coupler system involves the consideration of two modes of wave energy propagation which prevail in the mutually adjacent wave guide portions whose interiors are exposed to each other through the longitudinally extensive openings in the respective guides. It is customary to design a rectangular wave guide for efficient transmission of energy of a known frequency, the mode of transmission being a fundamental mode of the guide usually referred to as the $TE_{1,0}$ mode. This is the dominant transverse electric mode. The "$a$" dimension of the simple rectangular wave guide ordinarily is such as to prevent it from transmitting energy of this frequency in any of the known higher modes.

When two of such wave guides are juxtaposed with their narrower walls mutually adjacent, and these adjacent narrower walls are opened throughout an appreciable longitudinal extent, the effect is to substantially double the "$a$" dimension of this wave guide portion. This effectively enlarged wave guide portion is then capable of supporting energy in two modes of propagation, the first being closely related to the simple transverse electric mode $TE_{1,0}$ described in connection with the basic wave guide section, and the second mode being the "asymmetrical" mode designated $TE_{2,0}$. If inductive loading is provided as by the use of a series of spaced cross-bars each extending across the opening in one of the wave guides (or across the opening in the shutter element), such inductive loading brings about a departure of the symmetrical mode from the normal character of a $TE_{1,0}$ energy distribution in the enlarged wave guide section.

Whether or not inductive loading is provided, the symmetrical mode and the asymmetrical mode are propagated along the doubled wave guide section at different phase velocities. At the point of entrance of the energy into the double wave guide section, they are in phase in the lower guide (i. e., in wave guide 13), assuming this guide only is supplied with energy at its left-hand end, as by a source $S_2$. At the point of entrance into the doubled wave guide section, these components are in phase opposition in the upper wave guide (wave guide 11). Farther along the doubled wave guide section, however, the two components approach cophasality in the upper guide, even as they approach phase opposition in the lower guide. If the effective length of the opening between the guides is sufficient, complete energy transfer takes place from the lower guide to the upper guide with unidirectional propagation being maintained, away from the source end ($S_2$) and toward the opposite end of the structure, i. e., toward the right-hand end of wave guide 11.

If the effective length of the openings is less or greater than the length for complete energy transfer, then the energy will be divided, part of it being transferred and proceeding outward toward the right-hand end of wave guide 11 to utilization device $U_1$, the remaining part of the incident energy from source $S_2$ being retained in wave guide 13 and delivered to utilization device $U_2$.

If inductance cross-bars are provided across the opening in one of the wave guides, or across the opening 17 in shutter 15, as illustrated in Fig. 7, the effective length of the opening for complete energy transfer from one guide to the other must be appreciably greater, for example, three times greater than the effective length of the opening where no cross-bars are employed.

If desired, energy from two or more sources may be handled by the structure shown in Figs. 1–4 simultaneously. For example, a source $S_1$ may be coupled to the left-hand end of wave guide 11 and a source $S_2$ may concurrently supply energy to the left-hand end of wave guide 13. These sources need not be of equal frequencies, nor need they be specially related as to their amplitudes. It is only necessary that their frequencies be within the design frequency range of operation of the structure. With the shutter positioned in such a way as to completely block the openings, as shown in Figs. 1–3, all of the energy from source $S_1$ proceeds directly through to utilization device $U_1$, and all of the energy from source $S_2$ proceeds directly through wave guide 13 to utilization device $U_2$.

A shift of the shutter 15 to situate the opening 17 directly between the wave guides 11 and 13, as illustrated in Fig. 4, brings about a complete interchange of the communication circuits, so that the energy from source $S_1$ is then delivered to utilization device $U_2$ and the energy from source $S_2$ is delivered to utilization device $U_1$. Because of the appreciable longitudinal distribution of the coupling between wave guides 11 and 13, the transfer of energy proceeding from source $S_1$, over to wave guide 13, is accomplished with negligible leftward propagation (towards source $S_2$), and likewise, the transfer of energy proceeding from source $S_2$, over to wave guide 11, is accomplished with negligible propagation in wave guide 11 toward the left-hand end thereof.

Typical dimensions for an operating frequency of 10,000 megacycles per second are as follows:

| | Inches |
|---|---|
| Width (I. D.) of each wave guide | 0.40 |
| Height (I. D.) of each wave guide | 0.90 |
| Width of wave guide openings | 0.40 |
| Width of opening 17 in shutter 15 | 0.40 |
| Length of wave guide openings | 3.9 |
| Length of straight sides of opening 17 | 2.62 |
| Length of opening 17 | 3.0 |

The wave guide walls extend close to the surface of the shutter 15, but are slightly spaced therefrom, substantially equally as the tines of the serrated chokes are spaced from the shutter, as is clearly seen in Fig. 3. Preferably, for providing maximum continuity of transmission through the wave guides and avoiding small energy reflection components which could result from the effectively increased "$a$" dimension from the lower surface of piece 25 down to the upper surface of shutter 15, and the similarly increased "$a$" dimension from the upper surface of piece 27 to the lower surface of shutter 15, it is desirable to provide a longitudinally extensive boss or plate on each of pieces 25 and 27 coextensive with the wave guide openings 33 and 35, and of thickness equal to or slightly less than one-half the thickness of partition elements 29 and 31. By this arrangement, the effective "$a$" dimensions throughout each wave guide is substantially uniform when the shutter 15 is positioned as shown in Fig. 3 for preventing energy transfer between the two wave guides.

By making the length of the openings in the wave guides appreciably greater than the effective length for full energy transfer, an advantage of simplified construction is realized in that the constructor is enabled to make an experimental opening 17 in shutter 15, and if such opening proves to be of insufficient length, it may be extended by a relatively simple machining operation, or a series of operations, until the desired result is obtained. Similarly, for a given set of wave guides 11 and 13, various shutters with different lengths of the openings may be provided for complete energy transfer at a plurality of respective wave lengths, or on the other hand, openings of various lengths in the shutters may be provided for various amounts of energy transfer.

As will readily be apparent, moreover, one shutter element may be provided with a variety of openings of different lengths, as shown in Fig. 8, for accommodation to different operating wavelengths, or for enabling the user to position the shutter in a selected one of several positions for a desired percentage of the incident energy in one wave guide to be transferred to the other wave guide.

In the embodiment shown in Figs. 5 and 6, upper and lower wave guides 111 and 113 are fixed together as by structural elements 118 and 119, and an elongated shutter 115 is provided for longitudinal adjustment of its position between the elongated parallel sections of wave guides 111 and 113.

Serrated chokes 122, 124, 126, 128 are provided for affording the electrical effect substantially equivalent to direct junctions between shutter 115 and the walls of the upper and lower wave guides, without the requirement of direct friction contact, and for preventing the escape of energy from the confinement within the wave guides.

The elongated shutter 115 is guided in suitable grooves therefor in the structural elements 118 and 119, and is slightly spaced from the tines of the serrated chokes 122, 124, 126, 128 and from the adjacent edges of the wave guides 111 and 113.

Matching openings 133 and 135 are provided in wave guides 111 and 113, respectively, and an opening 117 which may be of similar configuration and of equal size, if desired, is provided in the shutter 115.

These openings are so situated that the shutter 115, shown set for a position of partial power transfer, may be moved to the right to a position of full register of the three openings, for full transfer, or may be moved to the left to a position completely preventing energy transfer from one wave guide to the other.

It is not essential for the length of the opening in the shutter to be exactly equal to the length of the openings in the wave guides since in any event the performance of the system is determined by the length of the effective opening for a given shutter setting.

It will be readily appreciated that the embodiment of Figs. 5 and 6 is usable in the same ways in which the embodiment of Figs. 1–4 may be used, for providing parallel transmission or crossed-over transmission, in two simultaneous communication paths, if desired. The structure of Figs. 5 and 6, however, has the additional feature that the degree of energy transfer may be continuously varied from the condition of substantially complete transmission directly through one wave guide (or in parallel paths through the parallel wave guides), to the condition of complete power interchange between the wave guides. This structure of Figs. 5 and 6 is thus suited for all of the applications for which the coupler of U. S. patent application Serial No. 197,064 is suited.

If desired, a scale of calibrations 149 may be provided on the shutter 115, for indicating the degree of power transfer in percentages, or in decibels, or on such other calibration basis as may be desired.

One of the elongated openings in the wave guides or in the shutter may be provided with a loading element or elements such for example as inductance cross-bars, if desired, as described above in connection with the embodiment of Fig. 1.

The structure illustrated in Figs. 9 and 10 is designed to be used for some of the purposes for which the structure of Figs. 5 and 6 is constructed. However, the embodiment in Figs. 9 and 10 is provided with only one wave guide coupling at the left-hand end, and hence it is not suited for use for simultaneously handling two complete energy transmission paths. The upper wave guide 211 is provided with an opening 233 in the lower wall surface thereof, and wave guide 213 is provided with a corresponding opening 235 in the upper wall surface thereof, the latter opening being shown provided with inductance cross bars 236. A plate 238 is provided along the upper wall surface of wave guide 211, coextensive with opening 233, for keeping substantially constant internal dimensions along this portion of the wave guide.

In this arrangement, the shutter structure 215 is arranged to operate within wave guide 213, the principal conductive surface portion 245 of the shutter 215 being parallel to the upper interior wall surface of wave guide 213 and spaced very slightly therefrom. Downwardly extending quarter-wavelength tines 247 are provided on the side of the shutter nearer to the observer in Fig. 9, and similarly, tines 241 are provided on the opposite side thereof, these tines 247 and 249 being slightly spaced from the respective side wall surfaces of wave guide 213, and serving as serrated chokes in cooperation with these side walls.

A slidable piston 251 is provided for supporting and aligning the outwardly extending shutter portion 245, 247, 249. This piston 251 is accurately conformal to the inner surfaces of the wave guide 213, and may be constructed as a cup-like metallic piston, filled with high-loss dielectric material 253, for absorbing any microwave energy which reaches the piston. A piston control rod 254 extends through a suitable bearing 255 at the left-hand end of wave guide 213, and a control knob 257 is provided thereon. The rod 254 may be calibrated, as schematically indicated at 259.

The left-hand end flange 261 of wave guide 211 may be coupled to a microwave energy source, and the right-hand end flanges 263 and 265 of wave guides 211 and 213, respectively, may be coupled to respective loads or energy utilization devices. With such a connection, the energy from the source is all conveyed to the load connected to flange 263 when the shutter system is positioned at the right-hand extreme of its travel, due to the complete closure or blocking of the registering openings 235 and 233. With the retraction of the shutter system to the left-hand extreme of its travel, entirely unblocking the openings 235 and 238, the energy from the source coupled to flange 261 is totally transferred into wave guide 213, and substantially all of this energy is directionally propagated therein to the utilization device or load at flange 265. The energy supplied at 261 may be divided between the paths of flange 263 and flange 265, in any proportion, accordingly as the shutter system is adjusted to any desired intermediate position, as for example, to the intermediate position indicated in Fig. 9.

In the converse sense, the structure of Figs. 9 and 10 may be employed as an energy combining manifold unit, with first and second sources of corresponding frequency and suitable phase relationship being coupled to flanges 263 and 265 and the shutter system being adjusted to that position at which the power contributions from the plural sources are properly combined, according to the ratio therebetween, to provide efficient transmission of their total output to the leftward through flange 261.

It will readily be appreciated that the structure of Figs. 5 and 6 may be used in generally the same ways as described above for the structure of Figs. 9 and 10, as well as for such applications as require two complete transmission paths through the selective transfer device.

The structure illustrated in Figs. 11 and 12 is a selective microwave energy transfer structure involving the same operating principles as in the previous embodiments, but with a ring-like physical arrangement for employment of a rotary shutter system 315, the principal wave guide system 311 being curved into an incomplete ring transmission path. A second wave guide 313 is rigidly positioned above a portion of wave guide 311 and is accurately conformal therewith over a period of its length.

Registering longitudinally extensive openings are provided through the upper interior surface of wave guide 311 and the lower interior surface of wave guide 313 for permitting full energy transfer from wave guide 311 to wave guide 313, with directional transmission maintained, to convey substantially the entire energy fed into wave guide 311 through flange 361 thereof, out through wave guide 313 and flange 365 thereof. Such complete energy transfer occurs through the registering openings of wave guide 311 and wave guide 313 when rotary shutter 315 is so positioned as to leave these openings totally unblocked.

A plurality of further wave guides 373 and 375 are similarly rigidly positioned above wave guide 311, and arranged with longitudinally extensive openings adjacent to similar registering openings in wave guide 311.

A spider frame including a hub 380 and arms 381, 383, and 385 may be provided for supporting the shutter bearing and for lending rigidity to the system. The upper wave guides 313, 373 and 375 are supported on brackets 387, 389 and 391, respectively, extending upward from wave guide 311. These brackets may, if desired, comprise extensions of the spider arms 381, 383 and 385.

Serrated chokes typified by chokes 392 and 393 are provided on wave guide 311, over arcuate regions thereof including and extending beyond the longitudinally extensive openings therein; and corresponding serrated chokes are provided along the sides of the arcuate portions of wave guides 313, 373 and 375, the spacing between the lower wave guide chokes 392, 393 and the chokes of the upper wave guides being slightly greater than the thickness of the shutter 315.

The clockwise end of wave guide 311 beyond the ends of the registering openings of wave guides 311 and 375 is provided with an energy absorber such as a filling of high-loss dielectric material.

With the shutter 315 positioned as illustrated in Fig. 11, blocking the communication path through the registering openings of wave guides 311 and 313, energy entering wave guide 311 at flange 361 is conveyed around to the registering openings of wave guides 311 and 373, and transferred from wave guide 311 to wave guide 373 through these openings, and transmitted outward through flange 374. The registering openings of wave guides 311 and 375 are blocked when the shutter 315 is positioned as seen in Fig. 11, but this is only incidental, since substantially none of the energy supplied through flange 361 remains untransferred and proceeds in wave guide 311 beyond wave guide 373.

Assuming the shutter 315 rotated 120° clockwise from the position seen in Fig. 11, the regions of communication to wave guides 313 and 373 are blocked, and the energy fed into wave guide 311 proceeds on around to the registering openings of wave guides 311 and 375, and is fully transferred to this wave guide, to proceed outward through flange 376.

The complete acceptance of energy by the system of Figs. 11 and 12 is not interrupted even when the energy proceeding clockwise through wave guide 311 first encounters a partially opened transfer system, because this results in partial transfer of the energy through such a transfer system, and complete transfer of the energy through the next open transfer system encountered by the energy continuing clockwise in wave guide 311. For example, assume shutter 315 rotated 90° clockwise from its position illustrated in Fig. 11. As thus repositioned, the shutter would entirely block the registering openings of wave guides 311 and 313, and would reduce by substantially half the effective length of the window or passage comprising the registering openings of wave guides 311 and 373. A partial energy transfer into wave guide 373 would result, the remaining energy proceeding onward in the clockwise direction in wave guide 311, and all being transferred out through fully open wave guide 375.

Like operation prevails if the shutter is so positioned as to block the registering openings of wave guides 311 and 375, and partially unblock the registering openings of wave guides 311 and 313. Such a position is obtainable if the shutter 315 is displaced a few degrees counterclockwise from the position illustrated in Fig. 11.

With the arrangement of the shutter 315 and the openings as illustrated in Fig. 11, there is always at least one fully open area of communication between wave guide 311 and another wave guide, and hence the power entering at flange 361 is always communicated to one or at most two of the output wave guide ends.

As in all of the previous forms of the invention, the source and load connections readily may be interchanged, a load device at flange 361 being supplied by one or another of the respective sources connected to guides 313, 373, and 375, or by microwave power contributions from two sources, simultaneously.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Selective microwave power transfer apparatus comprising first and second wave guides having substantially adjacent walls, each one of said substantially adjacent walls having a longitudinally extensive opening therein for microwave power transfer between said first and second wave guides, the length of said openings in said adjacent walls being substantially greater than the width of said adjacent walls for providing substantially full power transfer between said wave guides, each end of one of said wave guides being open for receiving applied microwave power at one end and for supplying microwave power to an external utilization device at the opposite end, and shutter means movable between said substantially adjacent walls for selective interposition between the openings in said substantially adjacent walls for controlling the transfer of microwave power between said first and second wave guides by varying the area of said openings.

2. Selective microwave power transfer apparatus as defined in claim 1, wherein said first and second wave guides are constructed as a rigid assembly including means restricting said shutter means to transverse movement therebetween.

3. Selective microwave power transfer apparatus as defined in claim 2, wherein said shutter means comprises a transversely movable conductive plate having at least one elongated opening therein parallel to the longitudinally extensive openings in said first and second wave guides.

4. Selective microwave power transfer apparatus as defined in claim 3, wherein said conductive plate has a series of parallel openings therein of different lengths.

5. Selective microwave power transfer apparatus as defined in claim 1, further including four serrated chokes, the first one including a series of tines along one edge of said first wave guide extending outward adjacent said shutter means, the second one including a series of tines along the opposite edge of said first wave guide extending outward adjacent said shutter means, and the third and fourth serrated chokes including third and fourth series of tines along the respective opposite edges of said second wave guide extending outward in opposite directions adjacent said shutter means.

6. Selective microwave power transfer apparatus comprising first and second wave guides having substantially equal rectangular internal cross-sectional configurations, each end of one of said wave guides being open for receiving applied microwave power at one end and for supplying microwave power to a utilization device at the opposite end, said first and second wave guides being rigidly fixed together and having respective mutually parallel sections wherein the broad sides of the first wave guide are coplanar with the respective broad sides of the second wave guide and one narrow wall of said first wave guide is parallel to and spaced a very slight distance from one narrow wall of said second wave guide, said one narrow wall of said first wave guide and said one narrow wall of said second wave guide each having a registering longitudinal opening therein, the longitudinal openings having a width equal to the distance between the coplanar broad walls of the guides and a length such as to effect complete transfer of energy transmitted by one of the guides to the other guide, means including a flat conductive shutter member movable between said mutually parallel sections of the first and second wave guides for varying the registering length of said longitudinal openings to control the energy transferred through the openings between the limits of full transfer and no transfer, and choke means positioned adjacent the edges of the registering openings for preventing leakage past said conductive member.

7. Selective microwave power transfer apparatus as defined in claim 6, wherein the energy controlling means include means fixed to at least one of said first and second wave guides for guiding said electrical conductor in longitudinal movement between said openings parallel to the axes of said first and second wave guides in said mutually parallel sections thereof.

8. Selective microwave power transfer apparatus as defined in claim 6, wherein the energy controlling means includes means for guiding said electrical conductor in transverse movement between said openings.

9. Selective microwave power transfer apparatus comprising first and second wave guides having substantially equal rectangular internal cross-sectional configurations, each end of one of said wave guides being open for receiving applied microwave power at one end and for supplying microwave power to an external utilization device at the opposite end, said first and second wave guides being rigidly fixed together and having respective mutually parallel sections wherein the broad sides of the first wave guide are substantially coplanar with the respective broad sides of the second wave guide and one of the narrow walls of said first wave guide is parallel to and spaced a very slight distance from one of the narrow walls of said second wave guide, said one narrow wall of said first wave guide and said one narrow wall of said second wave guide having a registering longitudinal opening therein, the longitudinal openings having a width equal to the distance between the coplanar broad walls of the guides and a length such as to effect complete transfer of energy transmitted by one of the guides to the other guide, and means including a flat conductive shutter member movable between said mutually parallel sections of said first and second wave guides for controlling energy transfer therebetween through said openings by varying the registering area of said openings.

10. Microwave energy transmission apparatus as defined in claim 9, further including a serrated choke at each side of said first wave guide adjacent said plate and a serrated choke at each side of said second wave guide adjacent said plate, said first and second wave guides being spaced apart by a dimension slightly greater than the thickness of said plate, and each of said serrated chokes comprising a series of transversely outwardly extending tines substantially parallel to and spaced slightly from said plate.

11. Microwave energy transmission apparatus as defined in claim 9, wherein said plate includes a scale of calibrations therein indicating the relationship between the variations of relative position thereof and the variations of relative power transfer.

12. Selective microwave power transfer apparatus comprising first and second wave guides respectively including first and second substantially adjacent wall surfaces, each end of one of said wave guides being open for receiving applied microwave power at one end and for supplying microwave power to an external utilization device at the opposite end, said first and second wave guides being rigidly fixed together and said first and second surfaces having longitudinally extensive registering openings therein through which the interiors of said first and second wave guides are exposed to each other for microwave power transfer therebetween, the openings in said adjacent wall surfaces being appreciably longer than the width of said wall surfaces for providing full power transfer between said wave guides, and shutter means of conductive material movable substantially along said walls for selectively blocking or unblocking the region of communication between said first and second wave guides for controlling the transfer of microwave power between said first and second wave guides.

13. Selective microwave power transfer apparatus as defined in claim 12, wherein said shutter means comprises a channel-shaped device longitudinally movable in said first wave guide, the web of the channel being immediately adjacent to said first surface and being movable through a range of positions including a position covering said opening therein, and the flanges of the channel being serrated and including substantially quarter wavelength tines extending parallel to and spaced slightly from the inner side wall surfaces of said first wave guide.

14. Selective microwave power transfer apparatus as defined in claim 12, wherein said shutter means comprises a metallic plate transversely movable between said first and second wave guides.

15. Apparatus as defined in claim 12 wherein the wave guides are rectangular with the broad walls being coplanar and the narrow walls forming the adjacent surfaces.

16. Selective microwave power transfer apparatus comprising first and second wave guides, each end of one of said wave guides being open for receiving applied microwave power at one end and for supplying microwave power to an external utilization device at the opposite end, sections of said wave guides having mutually adjacent wall portions, said wall portions having longitudinally extensive registering openings therein substantially longer than the width of said adjacent wall portions for completely transferring microwave power from one wave guide to the other wave guide, said wave guides being rigidly fixed together, shutter means movable between said mutually adjacent wall portions for selectively opening and closing the area of communication between the openings in said wall portions for controlling the transfer of microwave power between said first and second wave guides, and choke means positioned adjacent the edges of the registering openings for preventing leakage of power past said shutter means when said shutter means closes the area of communication between the openings in said wall portions.

References Cited in the file of this patent
UNITED STATES PATENTS

| | | |
|---|---|---|
| 1,732,051 | Johnson | Oct. 15, 1929 |
| 2,206,683 | Wolff | July 2, 1940 |
| 2,472,785 | Blitz | June 14, 1949 |
| 2,541,910 | Bangert | Feb. 13, 1951 |
| 2,544,715 | Muchmore | Mar. 13, 1951 |
| 2,562,281 | Mumford | July 31, 1951 |
| 2,568,090 | Riblet | Sept. 18, 1951 |
| 2,579,327 | Lund | Dec. 18, 1951 |
| 2,591,980 | Van Hofweegen et al. | Apr. 8, 1952 |
| 2,660,706 | Hill | Nov. 24, 1953 |
| 2,702,884 | Riblet | Feb. 22, 1955 |

OTHER REFERENCES

Publication I: "Technique of Microwave Measurements," edited by Montgomery, vol. 11 of Radiation Laboratory Series, published December 18, 1947, pp. 877–890. (Copy in Div. 69.)

Publication II: "Directive Couplers in Wave Guides," by Surdin, published in vol. 93, part IIIA, No. 4 on Jan. 17, 1947, in the (British) Journal of The Institution of Electrical Engineers; pp. 735 and 736 relied on. (Copy in 178–44–1F.)

Publication III: "A New Type of Waveguide Directional Coupler," by Riblet and Saad, published in volume 36, No. 1, pp. 61–64 of the Proceeding of The I. R. E. on January 1948. (Copy in Div. 51.)

UNITED STATES PATENT OFFICE
CERTIFICATE OF CORRECTION

Patent No. 2,820,201                                      January 14, 1958

Kiyo Tomiyasu

It is hereby certified that error appears in the printed specification of the above numbered patent requiring correction and that the said Letters Patent should read as corrected below.

Column 1, line 50, for "unlock" read -- unblock --; column 3, lines 27 and 28, for "November 11, 1950" read -- November 22, 1950 --; column 6, line 65, for "241" read -- 249 --; column 7, line 47, for "accurately" read -- arcuately --.

Signed and sealed this 13th day of January 1959.

(SEAL)
Attest:

KARL H. AXLINE                                            ROBERT C. WATSON
Attesting Officer                                          Commissioner of Patents